(12) United States Patent
Brunner

(10) Patent No.: US 12,213,618 B2
(45) Date of Patent: Feb. 4, 2025

(54) BEVERAGE PREPARATION MACHINE

(71) Applicant: SOCIETE DES PRODUITS NESTLE S.A., Vevey (CH)

(72) Inventor: Yann Brunner, Murist (CH)

(73) Assignee: Societe des Produits Nestle S.A., Vevey (CH)

( * ) Notice: Subject to any disclaimer, the term of this patent is extended or adjusted under 35 U.S.C. 154(b) by 687 days.

(21) Appl. No.: 15/768,061

(22) PCT Filed: Oct. 7, 2016

(86) PCT No.: PCT/EP2016/074067
§ 371 (c)(1),
(2) Date: Apr. 13, 2018

(87) PCT Pub. No.: WO2017/063953
PCT Pub. Date: Apr. 20, 2017

(65) Prior Publication Data
US 2018/0317699 A1    Nov. 8, 2018

(30) Foreign Application Priority Data
Oct. 15, 2015    (EP) ..................................... 15189951

(51) Int. Cl.
*A47J 31/46*    (2006.01)
*A47J 31/40*    (2006.01)
(52) U.S. Cl.
CPC ............... *A47J 31/46* (2013.01); *A47J 31/40* (2013.01); *A47J 31/401* (2013.01)

(58) Field of Classification Search
CPC ............ A47J 31/46; A47J 31/40; A47J 31/401
See application file for complete search history.

(56) References Cited

U.S. PATENT DOCUMENTS

| 5,768,975 | A | * | 6/1998 | Wu | ..................... | A47J 31/4489 |
| | | | | | | 99/290 |
| 2007/0131797 | A1 | * | 6/2007 | Balkau | ................ | A47J 31/4489 |
| | | | | | | 239/428.5 |
| 2009/0011105 | A1 | | 1/2009 | Mahlich et al. | | |

FOREIGN PATENT DOCUMENTS

| EP | 1088504 | | 4/2001 | | |
| EP | 1088504 | A1 * | 4/2001 | .......... | G07F 13/065 |
| WO | 2010034722 | | 4/2010 | | |

* cited by examiner

*Primary Examiner* — Stephanie A Cox
(74) *Attorney, Agent, or Firm* — K&L Gates LLP

(57) ABSTRACT

The invention concerns a beverage preparation machine (1) in which the beverage is prepared by introducing at least one jet of liquid, such as water, in a container (2) comprising a beverage ingredient (3), said machine comprising a nozzle (11) connected to a liquid supplying system (12), said nozzle comprising a tube (110), said tube comprising a liquid inlet (111) and a liquid outlet (112), the jet of liquid emerging from said liquid outlet, wherein the nozzle (11) comprises a sleeve (120), said sleeve presenting an internal section (Ss) greater than the internal section (So) of the liquid outlet end of the tube and said sleeve surrounding the jet of liquid emerging from the liquid outlet (112) of the tube.

7 Claims, 3 Drawing Sheets

BEVERAGE PREPARATION MACHINE

CROSS REFERENCE TO RELATED APPLICATIONS

The present application is a National Stage of International Application No. PCT/EP2016/074067, filed on Oct. 7, 2016, which claims priority to European Patent Application No. 15189951.5, filed on Oct. 15, 2015, the entire contents of which are being incorporated herein by reference.

FIELD OF THE INVENTION

The present invention relates to beverage preparation machines preparing foamed beverages preferably within a drinking container.

BACKGROUND OF THE INVENTION

There exist different methods for foaming beverages and in particular for foaming milk. One method requires the use of mechanical rotating elements to whip the beverage in a whipping chamber. Such elements and the chamber must be cleaned after use to avoid bacterial growth and degraded food odor and taste to develop in the device.

Another method enables the foaming of a beverage directly in the drinking cup. Foaming in the cup can be obtained by introducing steam and air in the beverage. The device delivering steam has to be immersed in the beverage to obtain an efficient foaming. This method presents the drawbacks of requiring a steam generator and a process for cleaning the device delivering steam after it has been introduced in the beverage. Moreover, due to the use steam, it is not possible to produce cold foamed milk Foaming in the cup can also be the result of introducing a jet of water in a beverage or in a container comprising a beverage ingredient like milk powder. For instance, WO 2010034722, EP-A1-1088504 or GB 2 379 624 relates to beverage making apparatus comprising at least one water nozzle to froth milk powder or milk within a drinking container. An advantage of these embodiments is that there is no need to clean the nozzle because it does not need to be introduced in the beverage.

Yet the resulting foam does not present the quality of foam made by steam foaming. In particular the foam can be irregular in terms of bubbles sizes and density and in terms of height of foam. In particular, when a coffee is introduced in the foamed milk to produce a cappuccino, the height of milk foam drastically decreases and the final beverage presents a less attractive aspect.

Therefore, an object of the present invention is to provide a nozzle for foaming beverage in a cup enabling the production of high quality foam starting form milk powder, milk concentrate or fresh milk, or from other beverage ingredients.

Besides it would be advantageous to provide a device for producing cold foamed milk.

SUMMARY OF THE INVENTION

In a first aspect of the invention, there is provided a beverage preparation machine in which the beverage is prepared by introducing at least one jet of liquid, such as water, in a container comprising a beverage ingredient, said machine comprising at least one nozzle connected to a liquid supplying system, said at least one nozzle comprising:

a tube, said tube comprising a liquid inlet and a liquid outlet, the jet of liquid emerging from said liquid outlet, and a sleeve, said sleeve presenting an internal section greater than the internal section of the liquid outlet end of the tube and said sleeve surrounding the jet of liquid emerging from the liquid outlet of the tube, the sleeve comprising at least one opening in its lateral wall, said opening being positioned near the liquid outlet end of the tube.

The machine comprises a nozzle for delivering a jet of liquid, usually water, in a container. Preferably the container is a drinking container. The machine can comprise a dispensing area in which the drinking container is positioned so that the jet of liquid delivered by the nozzle is dispensed in the container.

The beverage ingredient can be an ingredient that needs to be dissolved or diluted and foamed to obtain a beverage. It can be a soluble beverage powder or a beverage concentrate. During the introduction of water through the nozzle, the beverage is simultaneously reconstituted and foamed.

Such a soluble beverage powder can be instant coffee powder, chocolate powder, milk powder, instant tea powder, a fruit powder, a soup powder.

Such a beverage concentrate can be a coffee concentrate, milk concentrate, tea concentrate, a syrup.

The beverage ingredient can also be a beverage that needs to be foamed only. Such a beverage is usually milk. Generally, once foamed, this beverage can be mixed with another beverage to get the final beverage, for example foamed milk can be mixed with coffee to produce a cappuccino.

The machine comprises a liquid supplying system dispensing liquid to the liquid inlet of the tube. Usually the liquid is water and water is delivered to the nozzle by a water supplying system generally comprising a supply of water, such as a water tank or tap water, and a pump for pumping water from the supply and delivering it to the nozzle. The supply line feeding water to the nozzle can comprise a back pressure valve upstream the nozzle.

The water supplying system can comprise a heating device and/or a cooling device to adjust the temperature of water upstream to the nozzle.

The liquid supplying system can comprise a valve to control dispensing of water to the nozzle or to another device of the machine (such a s cleaning device, a mixing device, . . . ).

The nozzle introducing liquid in the container comprises a tube, said tube comprising a liquid inlet and a liquid outlet, the jet of liquid emerging from said liquid outlet.

Downstream the liquid outlet, the nozzle comprises a sleeve, said sleeve surrounding the jet of liquid emerging from the liquid outlet of the tube. As the internal section of the sleeve is greater than the internal section of the liquid outlet end of the tube, water flows as a jet in the internal volume defined by sleeve.

Generally the sleeve and the tube extend and are substantially centred along the same longitudinal axis.

The sleeve is configured for stabilizing the jet emerging from the liquid outlet for and keeping it close to a laminar flow, limiting turbulences. Downstream the liquid outlet, the liquid jet flows freely within the space defined by the sleeve. The internal section of the sleeve is configured so that water flows freely as a jet in the internal volume defined by the sleeve. The liquid jet is surrounded by the lateral walls of the sleeve but does not contact the internal walls of the sleeve liquid. The liquid does not fill the whole volume of the sleeve. The jet remains at a distance from the sleeve and does not fall as curtain along the walls of the sleeve.

Generally the sleeve presents a constant internal section along its longitudinal axis. Its internal section does not increase or decrease. Preferably the sleeve is a cylinder.

Preferably the liquid outlet end of the tube presents an internal section equivalent to the internal section of a circle of diameter comprised between 0.2 and 1.0 mm, preferably between 0.3 and 0.9 mm, even more preferably between 0.4 to 0.6 mm. Such a tube enables the dispensing of liquid such as water as a jet. Usually water is dispensed from this tube at a speed comprised between about 200 to 500 ml/min.

Generally, in the tube, the liquid inlet internal section is bigger than the liquid outlet internal section and the internal section of the tube decreases from the liquid inlet to the liquid outlet. The decrease can be continuous or the decrease can be step by step. Preferably the tube internal section decreases by one step. For a liquid outlet end of the tube presenting an internal section equivalent to the internal section of a circle of diameter comprised between 0.4 and 0.6 mm, the tube internal section can decrease by one step and the last internal section of the tube outlet can extend along at least 2 mm, preferably at most 5 mm along the tube.

For a liquid outlet end of the tube presenting an internal section equivalent to the internal section of a circle of diameter comprised between 0.4 and 0.6 mm, preferably the sleeve presents an internal section equivalent to the internal section of a circle of diameter comprised between 2 and 5 mm.

For a water outlet end of the tube presenting a bigger internal section, the internal section of the sleeve can be increased accordingly.

Generally the sleeve presents a length sufficiently long to stabilize the jet emerging from the liquid outlet. For a liquid outlet end of the tube presenting an internal section equivalent to the internal section of a circle of diameter comprised between 0.4 and 0.6 mm, generally the sleeve presents a length of at least 15 mm, preferably at most 25 mm. For a water outlet end of the tube presenting a bigger internal section, the length of the sleeve can be adapted accordingly.

The sleeve can comprise at least one opening in its lateral wall, said opening being positioned near the liquid outlet end of the tube. By near, it is meant that the opening is positioned closer to the liquid outlet end rather than to the downstream end of the sleeve. Preferably the opening is positioned as close as possible next to the liquid outlet end of the tube. This opening is configured for establishing a communication between the space internal to the sleeve and the outside of the nozzle.

Generally the opening presents an internal section equivalent to the internal section of a circle of diameter comprised between 0.4 and 0.6 mm, preferably of about 0.5 mm.

When water flows through the nozzle, the jet of water at the tube liquid outlet induces a depression in the sleeve and, accordingly, ambient air is sucked through the at least one opening in the sleeve. This air flows in the sleeve around the water jet and stabilizes this jet which emerges out of the sleeve as a strong jet with a thin shape. When this thin water jet hits the beverage in preparation in the drinking container, it enters deeply inside the beverage in preparation carrying along small air bubbles in the beverage and producing an efficient foaming.

According to one embodiment, the machine can comprise several nozzles such as described above.

According to one embodiment, the machine can comprise a device for closing the opening momentarily. This embodiment enables the alternative production of a flat beverage without foam by introduction of water and a soluble ingredient in the container.

The machine can comprise a liquid flavor supply and a device for connecting said liquid flavor supply to the opening momentarily. The liquid flavor can be a flavor concentrate or syrup. It can be stored in a container, said container being connected by tube to the opening in the sleeve. The device for connecting said liquid flavor supply to the opening momentarily can be a valve configured for enabling the connection of the opening either with air or with the liquid flavor supply.

Preferably when the machine comprises one single nozzle such as described above, the machine is configured for orienting the longitudinal axis of the nozzle essentially vertically during the delivery of the jet of liquid in the container. By "essentially vertically", it is meant that the angle of the longitudinal axis with vertical is less than 5°. Preferably the machine is configured for orienting the jet of the nozzle in the direction of the centre of the container positioned in a dispensing area of the machine.

If the beverage preparation machine comprises several nozzles, the machine is usually configured for orienting the longitudinal axis of the nozzles according to different directions. Preferably these directions present an angle with vertical of at most 15°. Preferably the longitudinal axis of one of the nozzles is essentially vertically oriented during the delivery of the jet of liquid in the container.

Preferably the machine comprises an actuator for vertically moving the container and/or the nozzle one to the other during the delivery of the jet of water in the container in order to keep the nozzle near the surface of the beverage during the beverage preparation.

Accordingly as long as the nozzle delivers liquid in the container and as long as the liquid fills the container, the nozzle and/or the container is moved in order to keep the nozzle end near, and preferably above, the surface of liquid in the container.

Preferably the nozzle is kept above the surface of the beverage during the beverage preparation and the distance between the nozzle and the surface of the beverage is of at least 5 mm, preferably at most 20 mm, even more preferably about 10 mm. Accordingly an efficient foaming is obtained. Moreover the nozzle is not dirtied by the beverage.

According to one less preferred embodiment the nozzle can partially penetrate in the beverage during preparation, yet this embodiment requires cleaning of the nozzle frequently.

Preferably the machine comprises:
  a first sensor for detecting the level of beverage in the container during the beverage preparation, and
  a controller configured for moving the container and/or the nozzle during the beverage preparation so that the nozzle is kept near the surface of the beverage during the beverage preparation.

This first sensor is preferably an optical sensor, yet any other sensor known for measuring height of liquid in a container can be used.

Preferably the machine comprises a second sensor for measuring the height, and preferably the internal volume, of the container before the beverage preparation.

Firstly this second sensor enables the determination of the height of the container. This information can be used for stopping the movement of the nozzle during the beverage preparation before the foam level reaches the top edge of the container.

Preferably this second sensor enables the calculation of the beverage volume to be dispensed in the container.

Preferably this second sensor is an ultrasonic sensor, yet any other sensor known for measuring height and volume of a container can be used.

The step of measuring the internal volume of the container can be implemented by moving the container under the second sensor before beverage preparation.

According to a second aspect, the invention provides a method for preparing a beverage with a beverage preparation machine such as described above, wherein:
- a—a beverage ingredient is introduced in a container,
- b—liquid, preferably water, is introduced in the container through the nozzle.

Preferably, before step b) the height of the container is measured. Accordingly step b) can be stopped before the foamed beverage overflows the container.

Preferably during step b), the container and/or the nozzle is/are moved one to the other so that the nozzle is kept near the surface of the beverage in preparation.

Usually liquid is introduced through the nozzle at a speed comprised between about 200 to 500 ml/min.

In step a) the beverage ingredient can be introduced automatically, for example by dosing a dose of beverage ingredient from a tank storing the ingredient in the beverage preparation machine. For example the beverage ingredient can be a soluble beverage powder stored in bulk in a canister and dose able by means of an auger or the beverage ingredient. Alternatively the beverage ingredient can be processed in the beverage preparation machine before being introduced in the container. For example the beverage ingredient can be extracted from a single serve container, like a capsule, and at least partially mixed with water before introduced in the container.

Alternatively the beverage ingredient can be introduced in the container manually. For example the operator can introduce fresh milk in the container.

The method can comprise a further step after step b) wherein a second beverage component is introduced in the container comprising the foamed beverage ingredient.

The second beverage component can be prepared in a beverage producing device of the machine, like a mixing chamber. According to a preferred embodiment, the foamed beverage ingredient can be foamed milk and the second beverage component can be coffee so that a cappuccino can be produced as a final beverage.

In the present text, "internal section" means implicitly transverse internal section of a tube or pipe.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures.

DETAILED DESCRIPTION OF THE DRAWINGS

Figure 1:
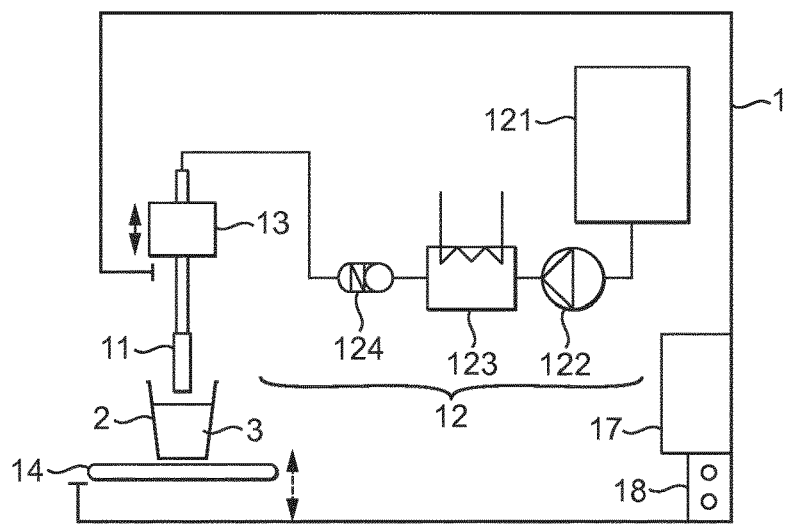
FIG. 1 is a schematic drawing of a beverage preparation machine according to the present invention.

FIG. 1 is a schematic drawing of a beverage preparation machine according to the invention.

A beverage preparation machine 1 comprises at a first level thereof:
- a beverage container support 14 for supporting a beverage container in which the beverage is prepared (this support can be optional in certain embodiments of the invention),
- a nozzle system dispensing a jet of liquid in the beverage container to prepare and foam a beverage within the container 2,
- a water supplying system 12, for supplying water to the nozzle system.

The machine 1 prepares a beverage by introduction of a jet of water in a container 2. This container is usually a drinking container. The machine preferably comprises a container support 14 for supporting, correctly positioning the container to the nozzle system and eventually moving the container.

The introduction of a jet of water in the container 2 enables either the dissolution and foaming of a soluble beverage ingredient, like a soluble powder or a concentrate, or the foaming of a beverage component present in the container, like milk.

The water supplying system 12 comprises:
- a tank 121 that can be replenished with fresh water, or eventually connected to tap water,
- a water pump 122 for pumping water from the tank 56. The pump can be any type of pump such as a piston pump, diaphragm pump or a peristaltic pump.
- a water heater 123 such as a thermoblock or a cartridge type heater to heat the pumped water, alternatively or in addition to, the machine can comprise a water cooler in a line bypassing the heater,
- a non-return valve 124.

The machine can be provided with a steam supplying device (not illustrated) so that steam can be produced and supplied to the nozzle system, preferably during a nozzle cleaning step.

The machine comprises an actuator 13 configured for vertically moving the nozzle 11 during the delivery of the jet of liquid in order to keep the nozzle near, and preferably above, the surface of the beverage during the beverage preparation. Alternatively or simultaneously the machine can comprise an actuator (not illustrated) configured for vertically moving the container support 14 (according to illustrated dotted arrows) during the delivery of the jet of liquid in order to keep the nozzle near, and preferably above, the surface of the beverage during the beverage preparation.

A processor 17 is provided to control a beverage upon the user actuating or being prompted to press a user interface 18 on the machine.

Figure 2:
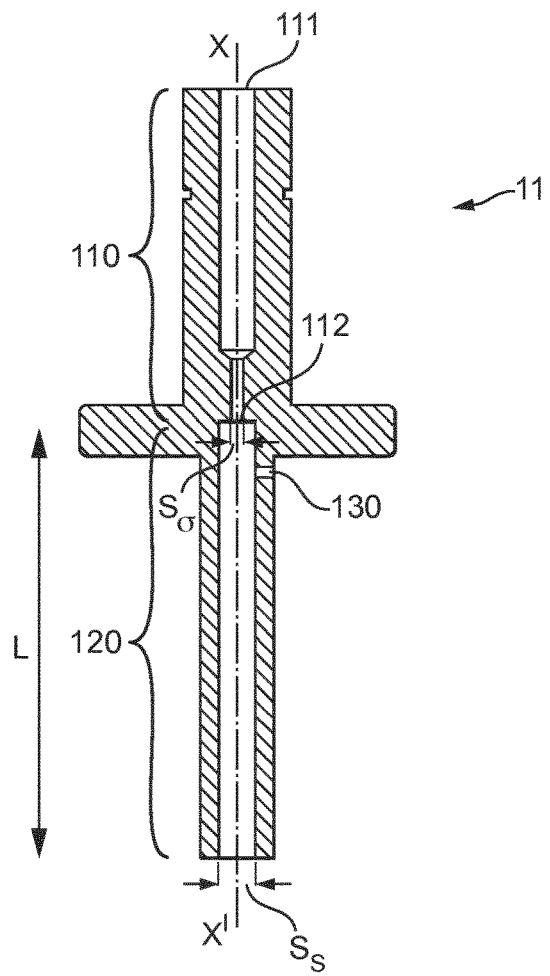
FIG. 2 shows a cross-internal sectional view of the nozzle used in the machine preparation machine according to the present invention.

FIG. 2 is a cross internal section view of the nozzle 1 implemented in FIG. 1. The nozzle 11 comprises a tube 110. This tube comprises a liquid inlet 111, connected to the liquid supplying system, and a liquid outlet 112, through which the jet of liquid emerges.

Preferably the liquid outlet end of the tube presents an internal section $S_o$ equivalent to the internal section of a circle of diameter comprised between 0.4 to 0.6 mm. Such a nozzle enable the dispensing of water as a jet. Usually water is dispensed at a speed comprised between about 200 to 500 ml/min.

As illustrated the tube internal section can decrease by one step between the tube inlet 111 and the tube outlet 112. The tube inlet can present a bigger internal section than the tube outlet essentially for manufacturing reasons as it becomes easier to remove the nozzle from the mould further to injection moulding process.

Preferably the last internal section of the tube outlet extends along at least 2 mm, preferably at most 5 mm along the tube.

Downstream the liquid outlet 112, the nozzle comprises a sleeve 120. This sleeve 120 surrounds the jet of liquid emerging from the liquid outlet 112 of the tube. The sleeve 120 and the tube 110 extend and are centred along the same longitudinal axis. Preferably the tube and the sleeve are cylinders.

The sleeve 120 presents an internal section $S_s$ equivalent to the internal section of a circle of diameter comprised between 2 and 5 mm.

Generally the sleeve 120 presents a length of at least 15 mm, preferably at most 25 mm. The tube inlet 111 can present the same internal section as the sleeve so that the nozzle 11 can be manufactured by providing a tube presenting an internal section $S_s$ and by introducing an insert within the conduit of the tube, said insert presenting an internal tube with an internal section corresponding to the internal section $S_o$ of the liquid outlet.

As illustrated the sleeve can comprise at least one opening 130 in its lateral wall, said opening being positioned near the liquid outlet end 112 of the tube.

Generally the opening 130 presents an internal section equivalent to the internal section of a circle of diameter of about 0.5 mm.

The above values for internal sections and lengths of the different elements of the nozzle can be adapted depending on the flow rate and the pressure of the diluent introduced there through.

The diluent is introduced in the nozzle with such a flow that a diluent jet of high velocity is created inside the container. In order to obtain a jet of diluent that reaches a sufficient velocity and therefore sufficient kinetic energy providing high shear forces to foam the beverage ingredient inside the container, the internal section of the tube and the flow rate of the diluent are adapted accordingly.

Figure 3:
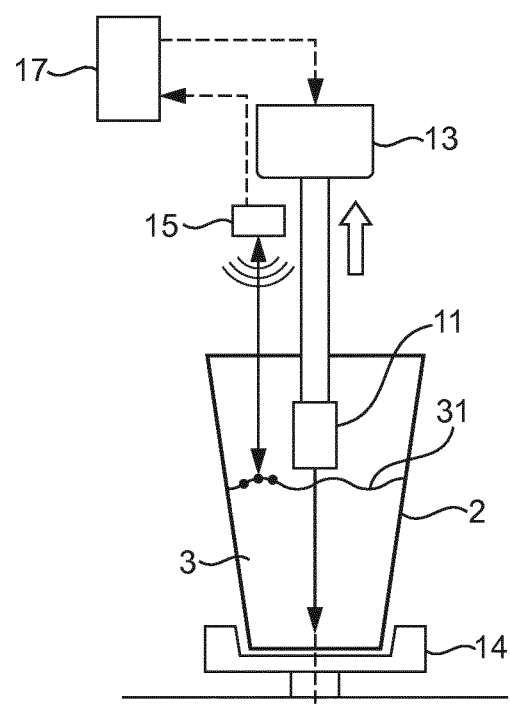
FIG. 3 illustrates the movement of the nozzle during the beverage preparation.

FIG. 3 illustrates the movement of the nozzle relative to the beverage surface during the beverage preparation according to one embodiment.

The body of the nozzle cooperates with an actuator 13 operable to control the distance between the bottom end of the nozzle and the surface of the beverage during the beverage preparation. Preferably the actuator is operable to translate the nozzle upwardly during the increase of beverage level in the container 2.

It is preferred that the nozzle bottom end remains above the surface of the beverage during the beverage preparation and does not touch the beverage.

In a less preferred mode, the nozzle bottom end can touch the surface of the beverage during the beverage preparation, yet it should not deep too much inside the beverage, for example, not more than 3 mm. This mode is less preferred because it requires a more frequent cleaning of the nozzle. Yet this mode leads to the production of a high volume of dense foam too because some beverage can be sucked in the opening 130 of the nozzle. Consequently big bubbles are reduced in size.

The control of the movement of the nozzle upwardly during the increase of beverage level in the container 2 is implemented by means of a sensor 15 continuously measuring the level of beverage in the container 2 during beverage preparation.

Based on information provided by the sensor 15 about the beverage level in the container, processor 17 controls the actuator 13 and the position of the nozzle above the beverage surface, preferably by keeping the nozzle continuously above the surface.

Preferably the sensor 15 is an optical sensor, such an IR sensor. Yet any other sensor for measuring the height of filled liquid in a container can be used.

According to another embodiment, the nozzle 11 can remain fixed and the container support 14 can be translated by an actuator in order to move the container 2 away from the nozzle bottom end during the beverage preparation.

Figure 4:
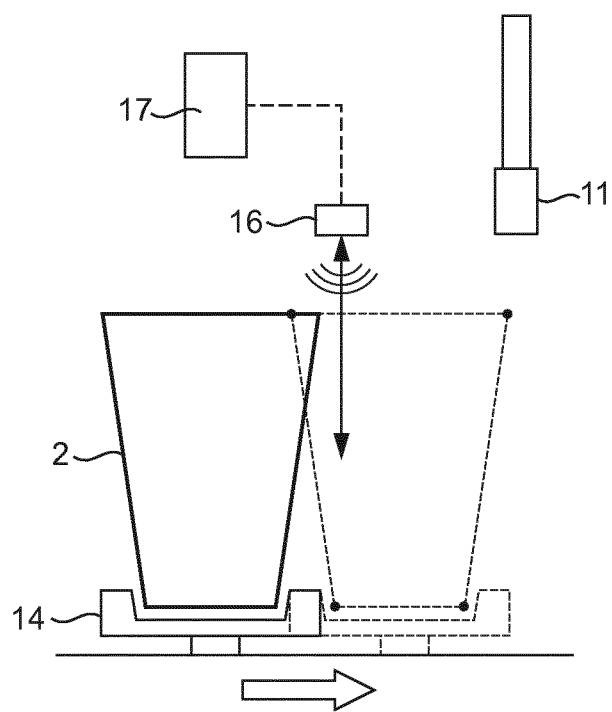
FIG. 4 illustrates one particular embodiment for detecting the height of the container before the beverage preparation.

FIG. 4 illustrates one particular embodiment for detecting container volume before the beverage preparation.

The container support 14 is configured for being movable once the container is positioned thereon. A sensor 16 is configured for sensing the container 2 during the movement of the container in order to measure the height, and preferably the internal volume, of the container. Based on information provided by the sensor 16 about the height of the container, processor 17 stops the actuator 13 when, during the beverage preparation, the beverage surface detected by the first sensor 15 reaches the top of the container.

Based on information provided by the sensor 16 about the volume of the container, the processor 17 calculates the volume of liquid to be injected through the nozzle to fill the container.

Preferably the sensor 16 is an ultrasonic sensor, such an IR sensor. Yet any other sensor for measuring the height and preferably the internal volume of a container can be used. Other ways for detecting container height, and eventually volume, can be implemented.

Control System

Figure 5:
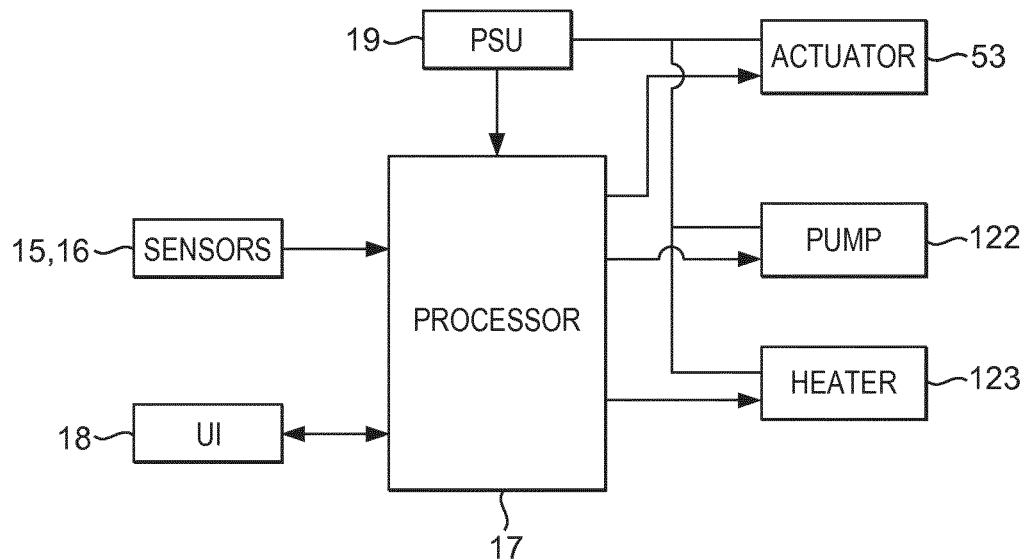
FIG. 5 illustrates the control system of the beverage preparation machine, FIG. 6 describes a particular embodiment of a beverage preparation machine according to the invention.

The control system, an example of which is illustrated in FIG. 5, is operable to control the nozzle system and optional heater, and generally comprises: a user interface 18, sensors 15, 16, processor 17, power supply 19, which are described sequentially.

The user interface 18 comprises hardware to enable an end user to interface with the processor 17 and hence is operatively connected thereto. More particularly: the user interface receives commands from a user; a user interface signal transfers the said commands to the processor 17 as an input. The commands may, for example, be an instruction to execute a foaming process and/or a beverage preparation. The hardware of the user interface 18 may comprise any suitable device(s), for example, the hardware comprises one or more of the following: buttons, such as a joystick button or press button, joystick, LEDs, graphic or character LDCs, graphical screen with touch sensing and/or screen edge buttons.

Sensors 15, 16 are operatively connected to the processor 17 to provide an input for monitoring the foaming process and/or a beverage preparation. The first sensor 15 provides the controller with input about the level of beverage in the container 2 during the beverage preparation, and the second sensor 16 provides the controller with input about the internal height of the container before the beverage preparation. Other optional sensors may be implemented like liquid temperature sensors.

The processor 17 is generally operable to: receive an input, i.e. the commands from the user interface 18 and from the sensors 15, 16; process the input according to program code stored on a memory unit (or programmed logic); provide an output, which is generally the said foaming process and/or beverage preparation process. The process is more preferably executed with closed-loop control using the input signal from the first sensor 15 as feedback. The processor 17 generally comprises memory, input and output system components, which are arranged as an integrated circuit, typically as a microprocessor or a microcontroller. The processor 17 may comprise other suitable integrated circuits, such as: an ASIC, a programmable logic device such as an FPGA, an analogue integrated circuit such as a controller. The processor 17 may also comprise one or more of the aforementioned integrated circuits, i.e. multiple processors.

The processor 17 generally comprises a memory unit for storage of the program code and optionally data. Typically the program code encodes a foaming process. The memory unit typically comprises: a non-volatile memory e.g. EPROM, EEPROM or Flash for program code and operating parameter storage, volatile memory (RAM) for data storage. The memory unit may comprise separate and/or integrated (e.g. on a die of the processor) memory.

The power supply 19 is operable to supply electrical energy to the processor 17, actuator device 53, pump 122 and heater 123.

The beverage preparation machine of the present invention presents the advantage of producing a coherent and stable jet enabling the production of a big quantity of foam, said foam presenting homogeneous bubbles sizes and accordingly a dense aspect. As a result foamed milk produced from 13 g of milk powder and 100 ml of hot water injected by the nozzle was produced with a height of dense foam of more than 3 cm.

Another advantage of the machine is that cold foamed beverage can be produced, in particular cold foamed milk, by supplying cold water to the nozzle system. The result is a cold foamed beverage, preferably cold foamed milk, which result cannot be obtained by foaming milk with steam.

Figure 6:
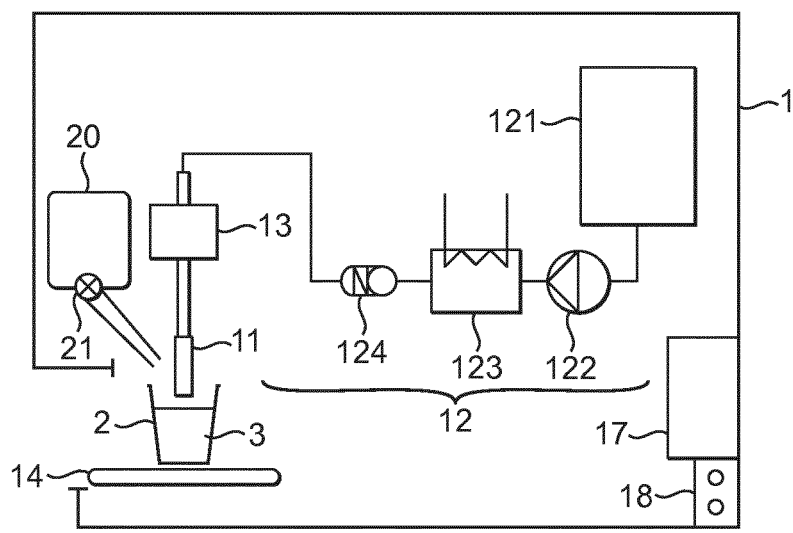

FIG. 6 describes a particular embodiment of a beverage preparation machine according to the invention comprising a tank 20 of soluble beverage powder and a device 21 for dosing the powder and dispensing said dose in the container 2. In the process of preparation of a beverage, a dose of soluble powder can be dispensed in the container and the beverage can be prepared therefrom by dispensing the liquid though the nozzle in the container. Preferably the powder is milk powder.

According to a variant, not illustrated, the beverage preparation machine can comprise a beverage production device for producing a beverage component within and for dispensing the resulting beverage component in the container 2 to foam it subsequently or to mix it with foamed beverage component previously foamed in the container.

This beverage production device can be a mixing chamber.

This machine enables for example the production of the following beverages:
- a frothed single component beverage, like foamed coffee or foamed milk, by dissolution of soluble coffee of milk powder in the mixing chamber, dispensing of the beverage in the drinking container 9, and then frothing of said beverage in the container with the nozzle.
- a frothed dual component beverage, like a cappuccino, by introduction of milk by the user in the drinking container, frothing of milk with the nozzle, and then dissolution of soluble coffee in the mixing chamber and dispensing of said coffee in the frothed milk.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

| List of references in the drawings: | |
|---|---|
| beverage preparation machine | 1 |
| nozzle | 11 |
| tube | 110 |
| liquid inlet | 111 |
| liquid outlet | 112 |
| sleeve | 120 |
| opening | 130 |
| liquid supplying system | 12 |
| pump | 122 |
| heater | 123 |
| valve | 124 |
| actuator | 13 |
| container support | 14 |
| sensor | 15, 16 |
| processor | 17 |
| user interface | 18 |
| power supply | 19 |
| container | 2 |
| beverage ingredient | 3 |

The invention claimed is:

1. A method for preparing a beverage with a beverage preparation machine, the beverage preparation machine comprising at least one nozzle connected to a liquid supplying system, the at least one nozzle comprising a tube, the tube comprising a liquid inlet and a liquid outlet, wherein the at least one nozzle further comprises a sleeve, the sleeve presenting an internal section greater than an internal section of the liquid outlet of the tube, and the sleeve surrounding the liquid outlet of the tube, and wherein the sleeve comprises at least one opening in a lateral wall of the sleeve, the opening being positioned near the liquid outlet end of the tube, the method comprising:
   introducing a beverage ingredient in a container in the beverage preparation machine;
   introducing at least one jet of liquid into the container through the liquid outlet of the at least one nozzle, wherein the sleeve surrounds the at least one the jet of liquid emerging from the liquid outlet; and
   sucking air through the at least one opening into the sleeve such that the air in the sleeve is flowing in the sleeve around the at least one jet of liquid, wherein the at least one jet of liquid enters inside the beverage in preparation, carrying along air bubbles in the beverage and producing foaming.

2. The method according to claim 1, further comprising, before the introducing of the at least one jet of liquid, measuring the height of the container.

3. The method according to claim 1, further comprising moving, during the introducing of the at least one jet of liquid into the container, the at least one nozzle and/or the container one to the other in order to keep the at least one nozzle above and near to a surface level of the beverage in preparation.

4. The method according to claim 1, further comprising stabilizing the at least one jet of liquid emerging from the liquid outlet along a length of the sleeve, the length is between 15 mm and 25 mm, and the liquid outlet having a diameter between 0.4 mm and 0.6 mm.

5. The method according to claim 1, wherein the at least one opening establishes a communication between the internal section of the sleeve and an outside of the at least one nozzle.

6. The method according to claim 1, wherein the at least one opening has a diameter of 0.5 mm.

7. The method according to claim 1, wherein the sleeve and the tube extend and are substantially centred along the same longitudinal axis, the sleeve presents a length of 15 mm to 25 mm, the tube comprises a first portion comprising the liquid inlet, the tube further comprising a last portion comprising the liquid outlet, the tube further comprising a step between the first and last portions of the tube and by which the internal section of the tube decreases from the first portion to the last portion, wherein the last portion has a diameter of 0.4 mm to 0.6 mm and a length of 2 mm to 5 mm.

\* \* \* \* \*